US012589487B2

(12) United States Patent  
Ihn et al.

(10) Patent No.:  US 12,589,487 B2  
(45) Date of Patent:      Mar. 31, 2026

(54) ROBOT ARM

(71) Applicant: KOREA INSTITUTE OF SCIENCE AND TECHNOLOGY, Seoul (KR)

(72) Inventors: Yongseok Ihn, Seoul (KR); Yunseong Na, Seoul (KR); Donghyun Hwang, Seoul (KR); Sungwook Yang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 32 days.

(21) Appl. No.: 18/468,968

(22) Filed: Sep. 18, 2023

(65) Prior Publication Data

US 2024/0375272 A1      Nov. 14, 2024

(30) Foreign Application Priority Data

May 11, 2023      (KR) ........................ 10-2023-0060840

(51) Int. Cl.  
B25J 9/10              (2006.01)

(52) U.S. Cl.  
CPC .............. B25J 9/106 (2013.01); B25J 9/104 (2013.01)

(58) Field of Classification Search  
CPC ...... B25J 9/0006; B25J 9/0021; B25J 9/0024; B25J 9/06; B25J 9/104; B25J 9/106; B25J 9/123; B25J 9/126; B25J 18/00; B25J 9/1065; B25J 9/0033; B25J 9/0042; B25J 9/0072; B25J 17/0283  
See application file for complete search history.

(56) References Cited

U.S. PATENT DOCUMENTS 4,723,460 A * 2/1988 Rosheim .............. B25J 17/0283  
                                                              901/29  
2016/0114479 A1* 4/2016 Rosheim ................ A61B 34/37  
                                                              901/23  
(Continued)

FOREIGN PATENT DOCUMENTS

CN          102490186 A      6/2012  
CN          107433582 A  * 12/2017   .......... B25J 15/0206  
(Continued)

OTHER PUBLICATIONS

CN 107433582 A English Translation (Year: 2017).*  
(Continued)

*Primary Examiner* — Joseph Brown  
(74) *Attorney, Agent, or Firm* — NSIP Law

(57)                    ABSTRACT

A robot arm according to the present disclosure comprises a motor portion; a support connected to the motor portion; first and second links connected to the motor portion and movable in a vertical direction; a first gimbal coupled to upper ends of the first and second links, respectively; third and fourth links coupled to the first gimbal; fifth and sixth links coupled to lower ends of the third and fourth links, respectively; seventh and eighth links coupled to central areas of the fifth and sixth links in the vertical direction; a second gimbal coupled to upper ends of the seventh and eighth links; ninth and tenth links coupled to the second gimbal; eleventh and twelfth links coupled to lower ends of the ninth and tenth links; and a top portion coupled to upper ends of the fifth and sixth links and upper ends of the eleventh and twelfth links.

12 Claims, 19 Drawing Sheets

(56)  References Cited

U.S. PATENT DOCUMENTS

| | | |
|---|---|---|
| 2017/0266806 A1 | 9/2017 | Radin |
| 2024/0198541 A1* | 6/2024 | Kew .................... B25J 19/0025 |

FOREIGN PATENT DOCUMENTS

| | | | | |
|---|---|---|---|---|
| CN | 108177152 A | * | 6/2018 | .......... B25J 11/0075 |
| EP | 1748095 A2 | * | 1/2007 | .......... D03D 47/272 |
| JP | 2018-75678 A | | 5/2018 | |
| KR | 10-2011-0061026 A | | 6/2011 | |
| KR | 10-2019-0041714 A | | 4/2019 | |

OTHER PUBLICATIONS

CN 108177152 A English Translation (Year: 2018).*
Wikipedia contributors. (May 6, 2023). Gimbal. In Wikipedia, The Free Encyclopedia. Retrieved 21:50, Jan. 8, 2025, from https://en.wikipedia.org/w/index.php?title=Gimbal&oldid=1153433777 (Year: 2023).*
English translation of EP-1748095-A2 (Year: 2007).*
Korean Office Action Issued on Aug. 21, 2025, in Counterpart Korean Patent Application No. 10-2023-0060840 (2 Pages in English, 2 Pages in Korean).

* cited by examiner

ROBOT ARM

CROSS-REFERENCE TO RELATED APPLICATION

This application claims priority to and the benefit of Korean Patent Application No. 10-2023-0060840 filed in the Korean Intellectual Property Office on May 11, 2023, the entire contents of which are incorporated herein by reference.

BACKGROUND OF THE INVENTION

Field of the Invention

The present disclosure relates to a robot arm. More specifically, it relates to a robot arm that is attached to a robot shoulder and enables multi-degree-of-freedom movement of a robot hand.

Description of the Related Art

In various fields of modern industrial society, the importance of robot arms has been highlighted in order to increase product productivity, improve product quality, and reduce product production costs.

The robot arm is a robot that operates similarly to a human arm and is put into industrial sites such as steel, shipbuilding, chemistry, and construction in place of humans to perform high-risk work. For example, the robot arm may perform debris handling, transportation, and the like at an industrial site or an accident site.

In order to change the direction of the grasping point of the robot arm, joints dependent on the shoulder, arm, wrist and the like must be moved together. The degree of movement of the dependent joint increases as the length from the center of rotation of the wrist to the grasping point, that is, the radius of rotation increases.

Conventional robot arms have a problem of a large radius of rotation due to many factors such as a motor and a space for control.

SUMMARY OF THE INVENTION

An object to be solved by the present disclosure is to provide a robot arm capable of improving space efficiency by reducing the radius of rotation.

In addition, an object to be solved by the present disclosure is to provide a robot arm capable of reducing the moment generated during driving by arranging heavy components of the motor portion below.

In addition, an object to be solved by the present disclosure is to provide a robot arm that enables precise operation of a top portion.

A robot arm according to one aspect of the present disclosure for achieving the above object may include a motor portion; a support connected to the motor portion; first and second links connected to the motor portion and movable in a vertical direction; a first gimbal coupled to upper ends of the first and second links, respectively; third and fourth links coupled to the first gimbal; fifth and sixth links coupled to lower ends of the third and fourth links, respectively; seventh and eighth links coupled to central areas of the fifth and sixth links in the vertical direction; a second gimbal coupled to upper ends of the seventh and eighth links; ninth and tenth links coupled to the second gimbal; eleventh and twelfth links coupled to lower ends of the ninth and tenth links; and a top portion coupled to upper ends of the fifth and sixth links and upper ends of the eleventh and twelfth links.

Through this, it is possible to improve space efficiency by reducing the radius of rotation of the robot arm.

In addition, an upper end of the support may be coupled to the second gimbal, and a central area in the vertical direction of the support may be coupled to the first gimbal, and the motor portion may include a first motor unit that rotates the support about a vertical axis.

In addition, the first motor unit may include a first gear formed at a lower end of the first motor unit, and the support may include a second gear formed at a lower end of the support and meshing with the first gear.

In addition, the motor portion may include third and fourth gears meshing with the second gear and overlapped with the first gear in a horizontal direction.

In addition, the motor portion may include a housing and a gear portion disposed below the housing, the first motor unit, except for a lower end area, may be disposed in the housing, and the first to fourth gears may be disposed in the gear portion.

In addition, the motor portion may include a second motor unit that moves the first link in the vertical direction, and a third motor unit that moves the second link in the vertical direction.

In addition, when the second motor unit and the third motor unit move the first link and the second link in the same direction, the top portion may rotate about a first axis perpendicular to the vertical axis, and when the second motor unit and the third motor unit move the first link and the second link in different directions, the top portion may rotate about a second axis perpendicular to the vertical axis and the first axis.

In addition, the second motor unit may include a fifth gear disposed at a lower end of the second motor unit, and the motor portion may include a first rotating member including a sixth gear meshing with the fifth gear, and a first moving member that moves in the vertical direction according to rotation of the first rotating member and is coupled with the first link.

In addition, the third motor unit may include a seventh gear disposed at a lower end of the third motor unit, and the motor portion may include a second rotating member including an eighth gear meshing with the seventh gear, and a second moving member that moves in the vertical direction according to rotation of the second rotating member and is coupled with the second link.

In addition, the first link may be hinged to the first moving member, and the second link may be hinged to the second moving member.

In addition, the robot arm may further comprise a first wire, wherein one end of the first wire is coupled to an upper area of the second link, and other end of the first wire is coupled to the motor portion, and the first wire sequentially may pass through the twelfth link, the top portion, and the fifth link while going from the one end to the other end of the first wire.

In addition, the motor portion may include a first roller disposed in the housing, a first guide member and a first fixing member disposed on a lower surface of an upper plate of the housing, and a first elastic member, wherein one end of the first elastic member is coupled to a lower surface of the first roller and other end of the first elastic member is coupled to a lower area of the housing, and the first wire may penetrate the upper plate of the housing, may pass through the first guide member and may wrap around the first roller, and the other end of the first wire may be fixed to the first fixing member.

In addition, the robot arm may further comprise a second wire, wherein one end of the second wire is coupled to an upper area of the first link, and other end of the second wire is coupled to the motor portion, the motor portion may include a second roller disposed in the housing, a second guide member and a second fixing member disposed on a lower surface of an upper plate of the housing, and a second elastic member, wherein one end of the second elastic member is coupled to a lower surface of the second roller and other end of the second elastic member is coupled to a lower area of the housing, and the second wire may sequentially pass through the eleventh link, the top portion, and the sixth link while going from the one end to the other end, and may penetrate the upper plate of the housing, may pass through the second guide member and may wrap around the second roller, and the other end of the second wire may be fixed to the second fixing member.

Through the present disclosure, it is possible to provide the robot arm capable of improving space efficiency by reducing the radius of rotation.

In addition, through the present disclosure, it is possible to provide the robot arm capable of reducing a moment generated during driving by arranging heavy components of the motor portion below.

In addition, through the present disclosure, it is possible to provide the robot arm that enables precise operation of the top portion.

BRIEF DESCRIPTION OF THE DRAWINGS

Figure 11:
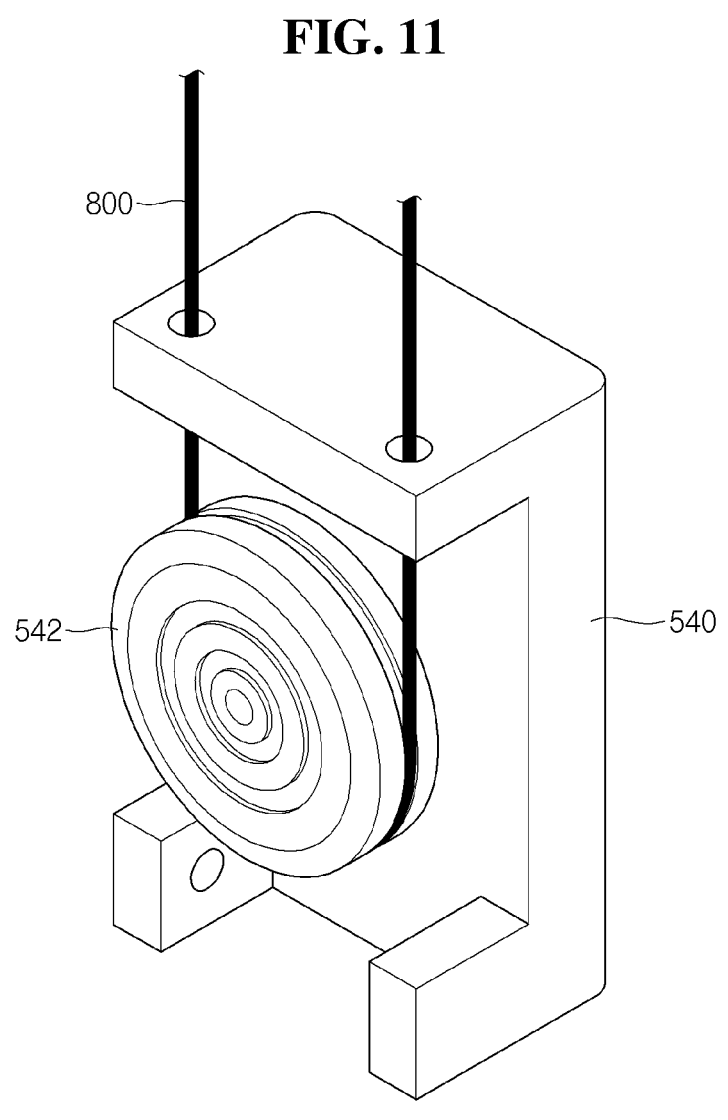

FIG. 11 is a perspective view of a second roller and a second wire of a robot arm according to an embodiment of the present disclosure.

DETAILED DESCRIPTION OF THE EMBODIMENTS

Figure 1:
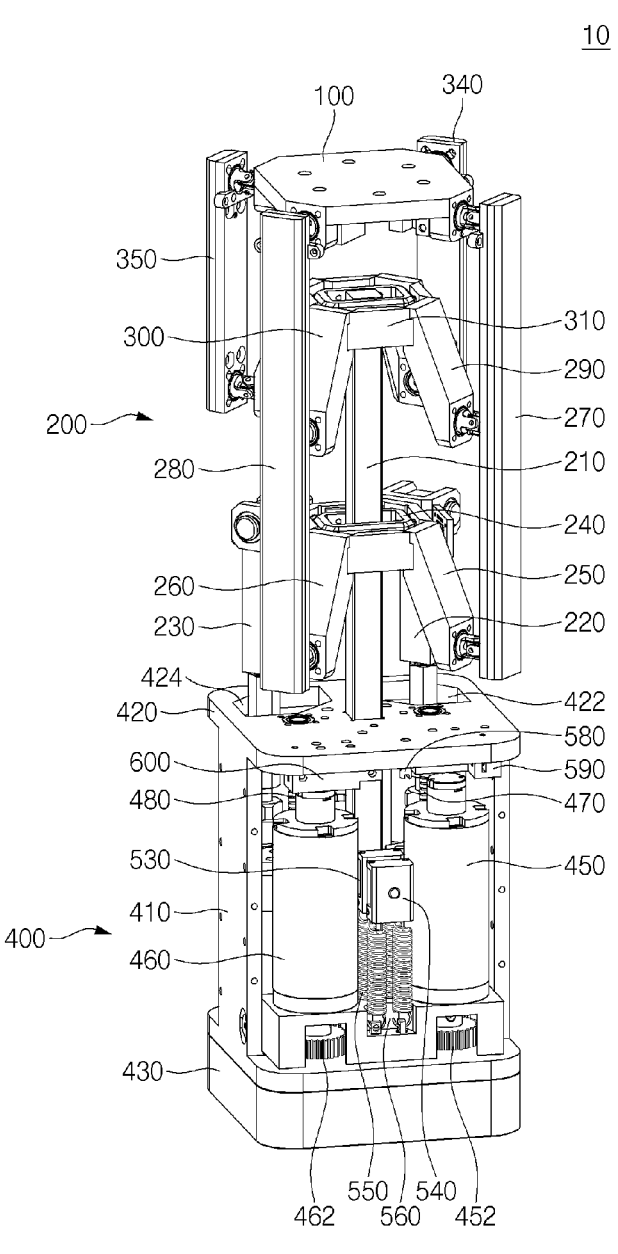
FIGS. 1 and 2 are perspective views of a robot arm according to an embodiment of the present disclosure.

Hereinafter, embodiments disclosed in the present disclosure will be described in detail with reference to the accompanying drawings, however, regardless of the reference numerals, the same or similar components will be given the same reference numerals and redundant description thereof will be omitted.

In describing the embodiments disclosed in the present disclosure, when a component is referred to as being "connected" or "accessed" to other component, it may be directly connected or accessed to the other component, however, it may be understood that other components may be present in the middle.

In addition, in describing the embodiments disclosed in the present disclosure, when it is determined that the detailed description of the related known technology may obscure the subject matter of the embodiments disclosed in the present disclosure, the detailed description thereof will be omitted. In addition, the accompanying drawings are only for easily understanding the embodiments disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

On the other hand, terms of disclosure may be replaced with terms such as document, specification, description.

Figure 2:
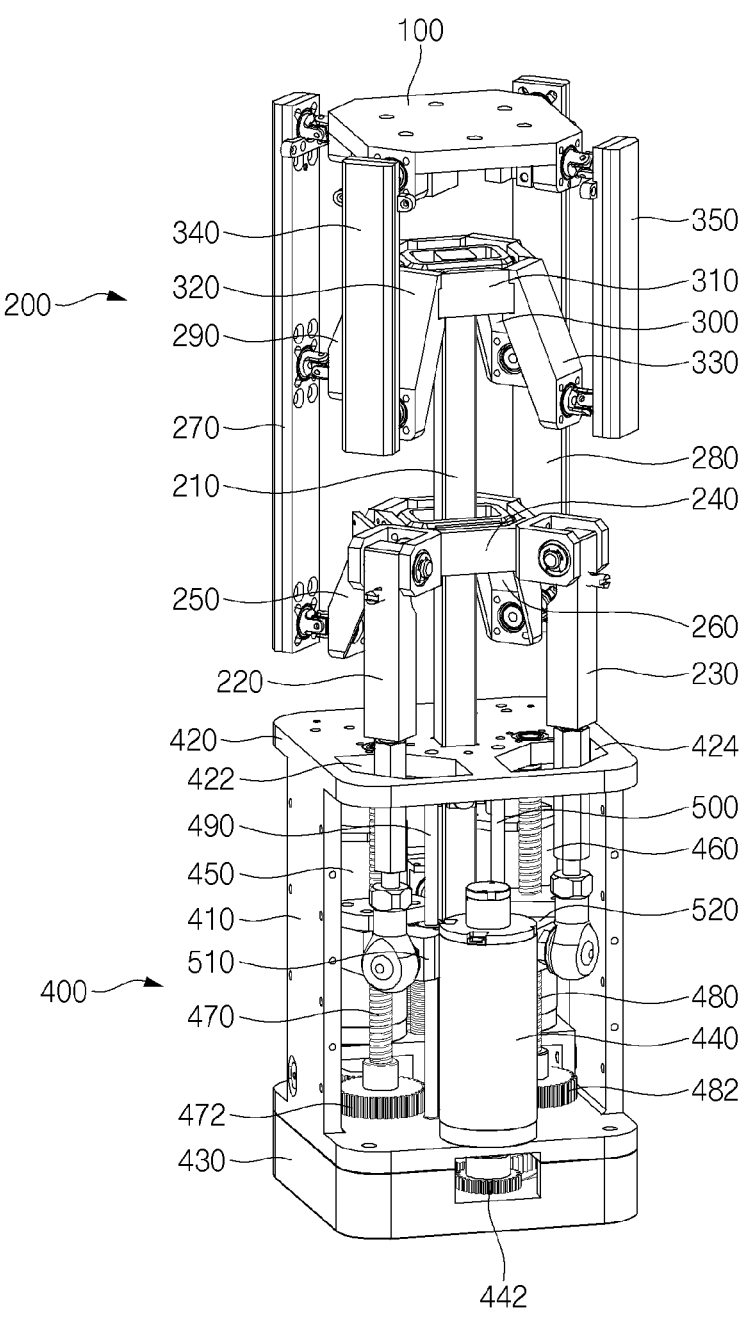
Figure 3:
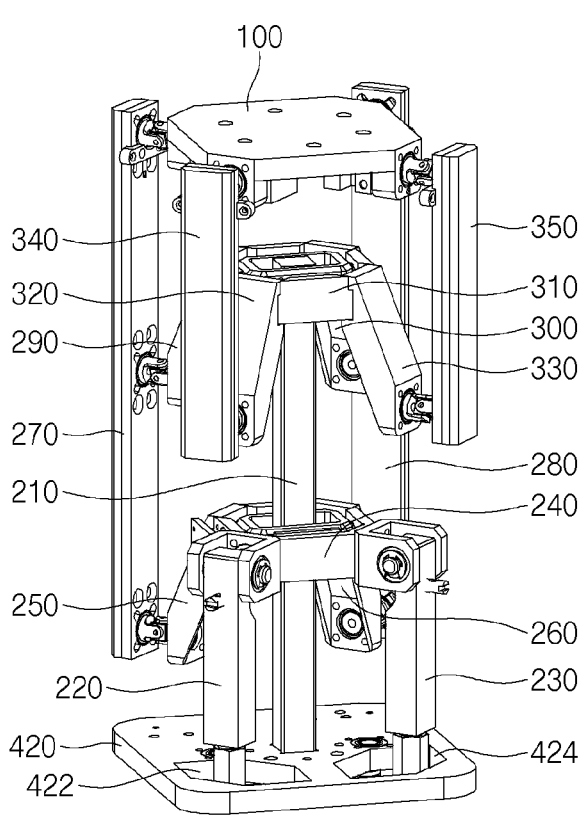
FIGS. 3 and 4 are perspective views of a top portion and a link portion of a robot arm according to an embodiment of the present disclosure.
Figure 4:
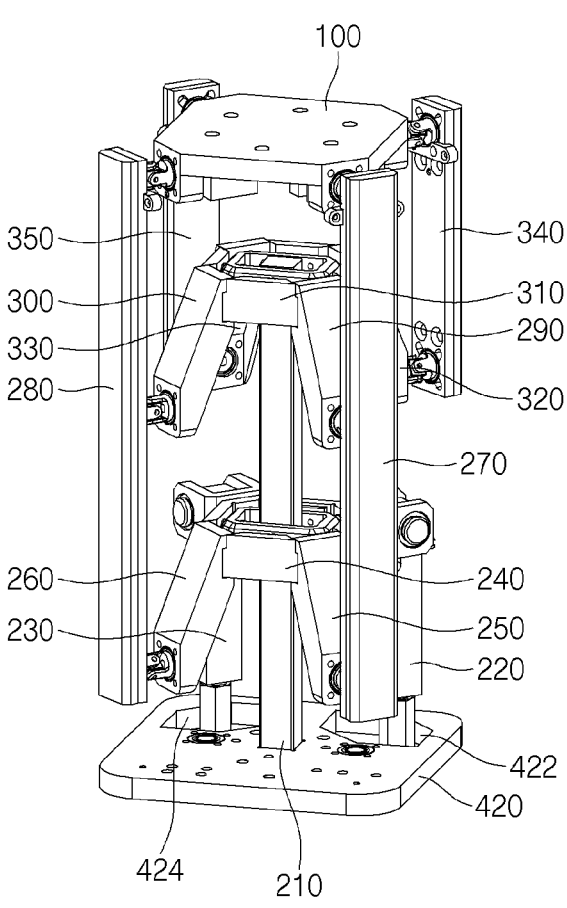
Figure 5:
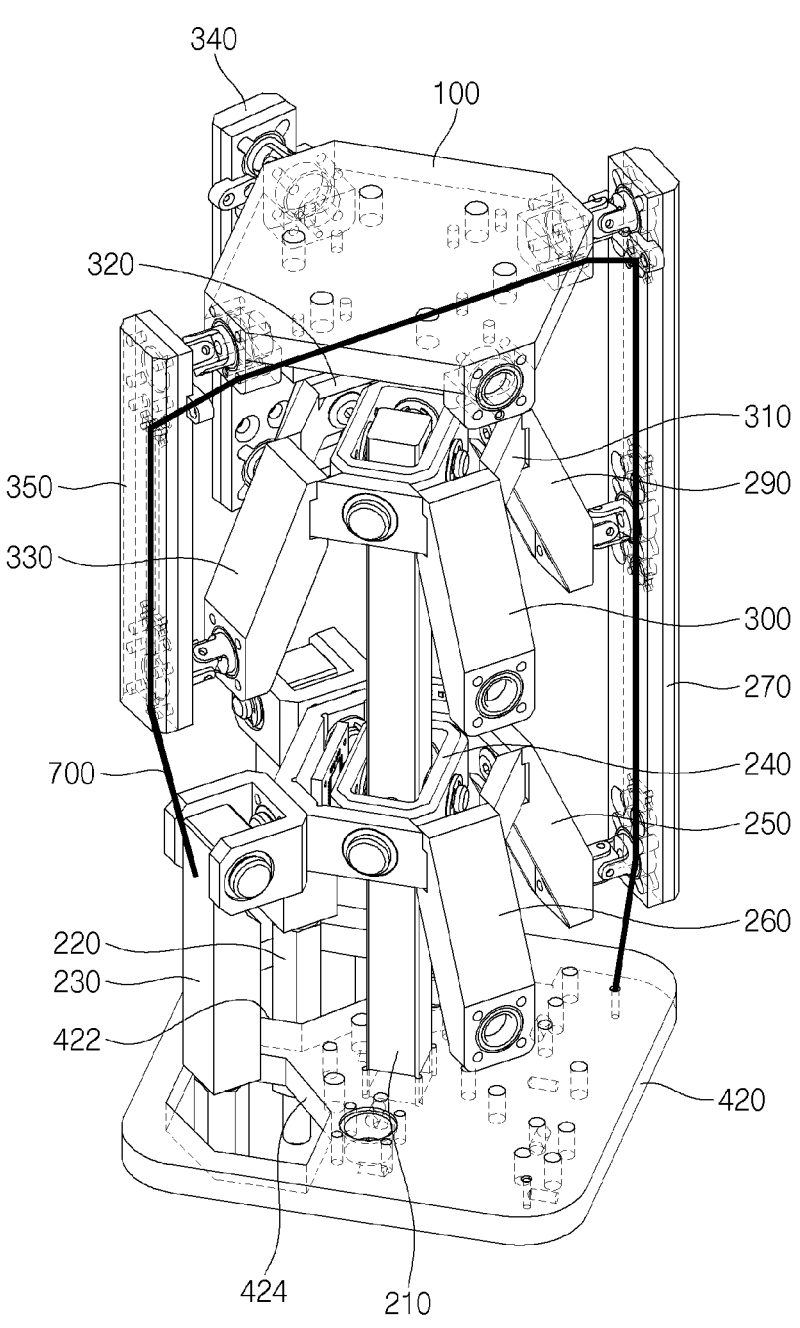
FIG. 5 is a perspective view of a top portion, a link portion, and a first wire of a robot arm according to an embodiment of the present disclosure.
Figure 6:
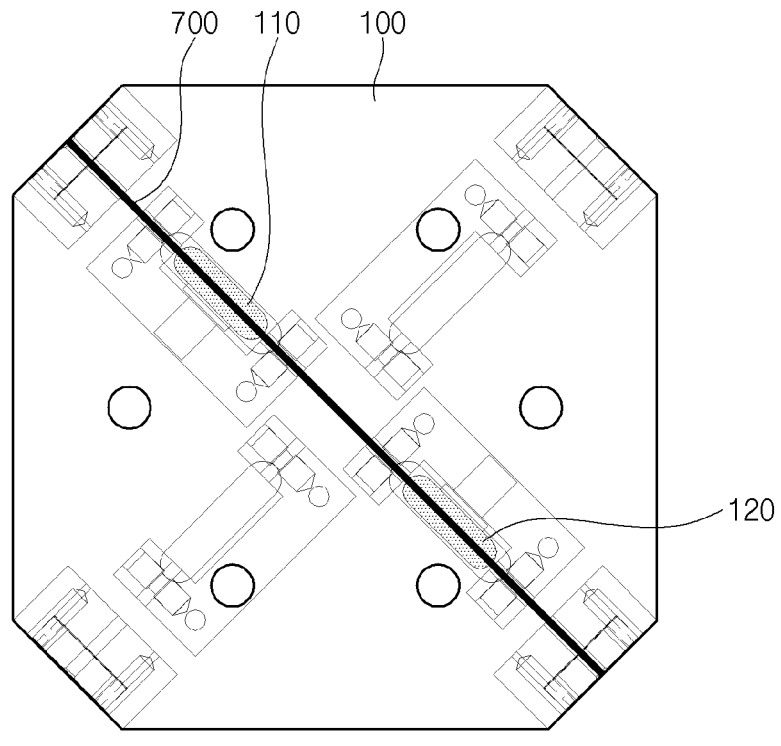
FIG. 6 is a perspective view of a top portion and a first wire of a robot arm according to an embodiment of the present disclosure.
Figure 7:
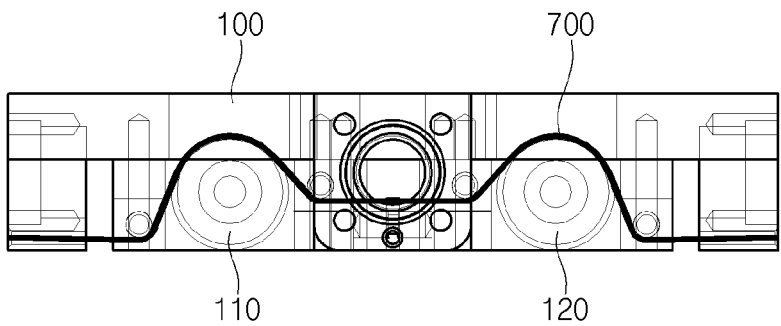
FIG. 7 is a cross-sectional view of a top portion and a first wire of a robot arm according to an embodiment of the present disclosure.
Figure 8:
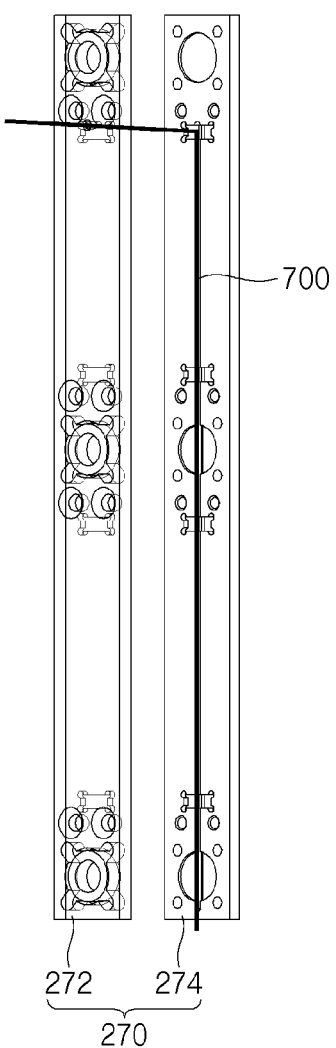
FIG. 8 is an exploded perspective view of a fifth link and a first wire of a robot arm according to an embodiment of the present disclosure.
Figure 9:
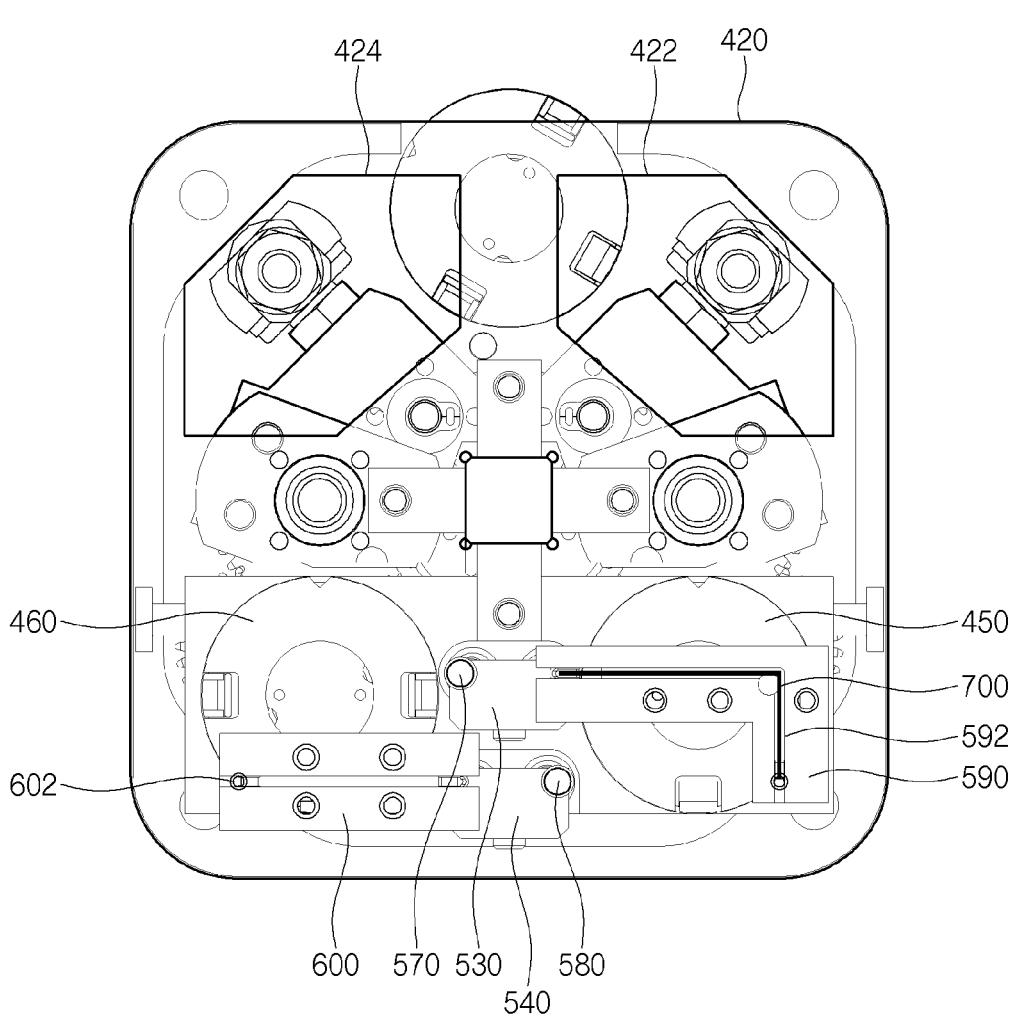
FIG. 9 is a planar perspective view of a motor portion and a first wire of a robot arm according to an embodiment of the present disclosure.
Figure 10:
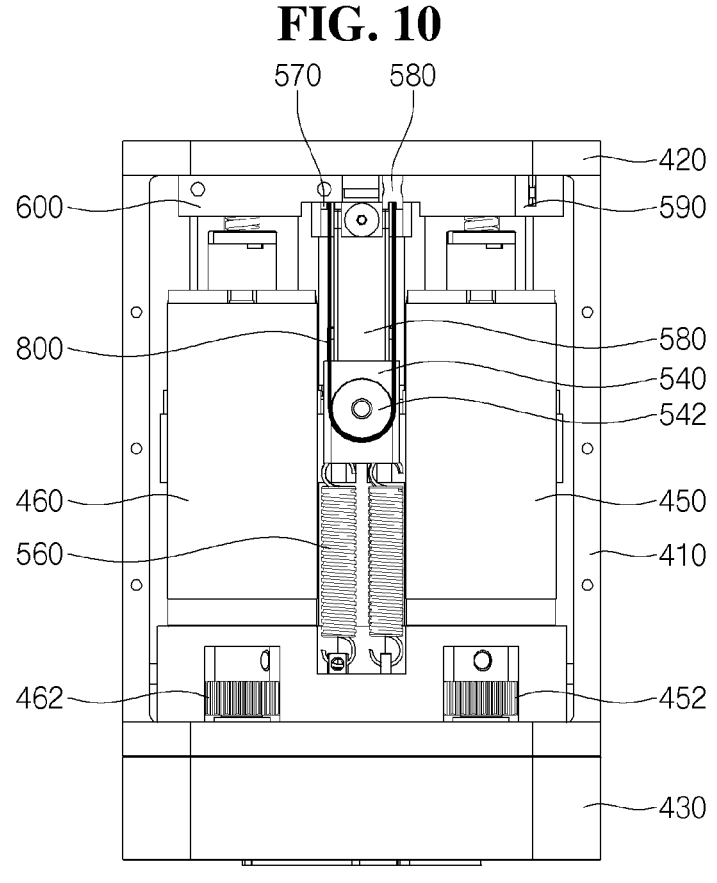
FIG. 10 is a rear view of a motor portion of a robot arm according to an embodiment of the present disclosure.
Figure 12:
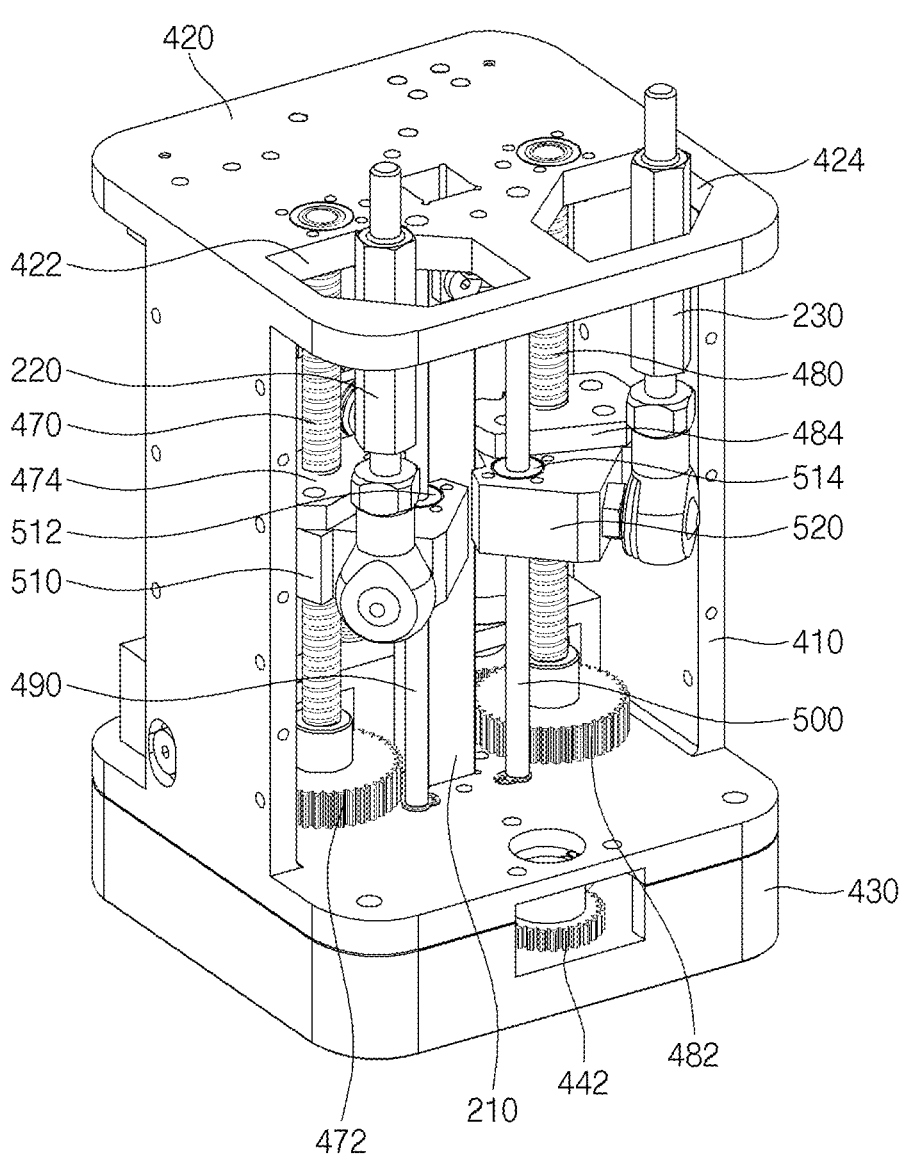
FIG. 12 is a perspective view of a motor portion of a robot arm from which a first motor unit is removed according to an embodiment of the present disclosure.
Figure 13:
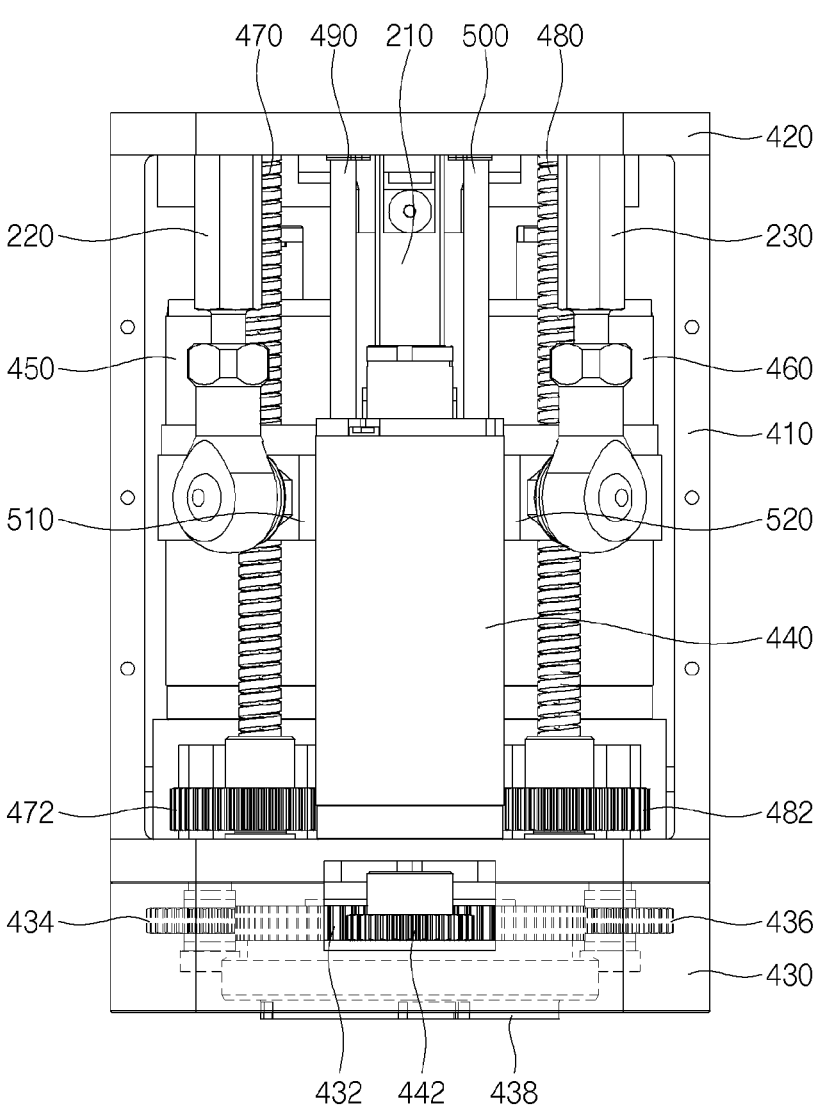
FIG. 13 is a front view of a motor portion of a robot arm according to an embodiment of the present disclosure.
Figure 14:
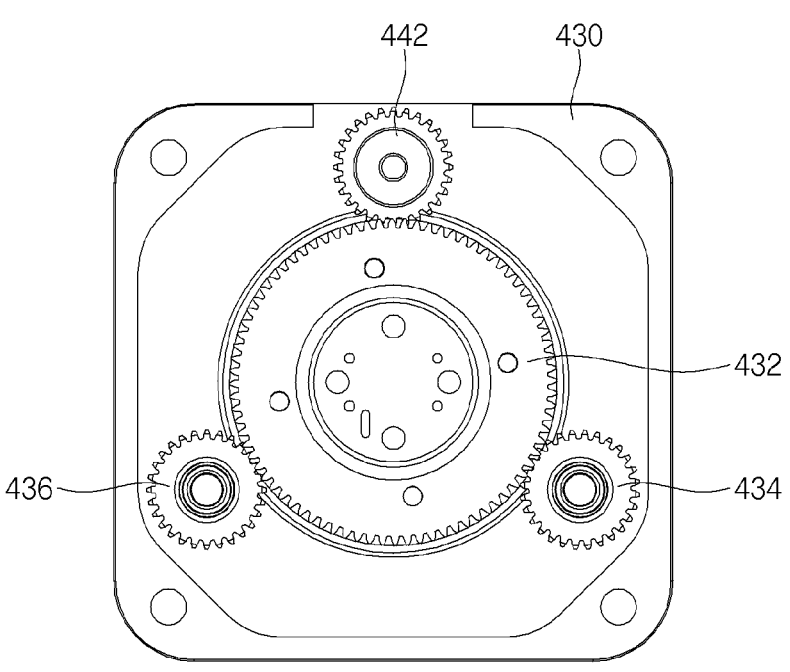
FIG. 14 is a plan view of a gear portion of a motor portion of a robot arm according to an embodiment of the present disclosure.

FIGS. 1 and 2 are perspective views of a robot arm according to an embodiment of the present disclosure. FIGS. 3 and 4 are perspective views of a top portion and a link portion of a robot arm according to an embodiment of the present disclosure. FIG. 5 is a perspective view of a top portion, a link portion, and a first wire of a robot arm according to an embodiment of the present disclosure. FIG. 6 is a perspective view of a top portion and a first wire of a robot arm according to an embodiment of the present disclosure. FIG. 7 is a cross-sectional view of a top portion and a first wire of a robot arm according to an embodiment of the present disclosure. FIG. 8 is an exploded perspective view of a fifth link and a first wire of a robot arm according to an embodiment of the present disclosure. FIG. 9 is a planar perspective view of a motor portion and a first wire of a robot arm according to an embodiment of the present disclosure. FIG. 10 is a rear view of a motor portion of a robot arm according to an embodiment of the present disclosure. FIG. 11 is a perspective view of a second roller and a second wire of a robot arm according to an embodiment of the present disclosure. FIG. 12 is a perspective view of a motor portion of a robot arm from which a first motor unit is removed according to an embodiment of the present disclosure. FIG. 13 is a front view of a motor portion of a robot arm according to an embodiment of the present disclosure. FIG. 14 is a plan view of a gear portion of a motor portion of a robot arm according to an embodiment of the present disclosure.

Referring to FIGS. 1 to 14, a robot arm 10 according to an embodiment of the present disclosure may include a top portion 100, a link portion 200, a motor portion 400, a first wire 700, and a second wire 800, but may be implemented except for some of these configurations, and other additional configurations are not excluded.

A robot hand 1 may be mounted on the robot arm 10. The robot arm 10 may be mounted on a robot to enable multi-degree-of-freedom movement of the robot hand 1.

The top portion 100 may be connected to the link portion 200. The top portion 100 may receive driving force generated from the motor portion 400 through the link portion 200. The robot hand 1 may be installed on the top portion 100. The top portion 100 may enable multi-degree-of-freedom movement of the robot hand 1 through the link portion 200 and the motor portion 400.

The top portion 100 may be coupled to upper areas of a fifth link 270, a sixth link 280, an eleventh link 340, and a twelfth link 350. The top portion 100 may be formed in a square plate shape. The upper areas of the fifth link 270, the sixth link 280, the eleventh link 340, and the twelfth link 350 may be coupled to each corner of the top portion 100.

The link portion 200 may be disposed between the top portion 100 and the motor portion 400. The link portion 200 may transmit driving force of the motor portion 400 to the top portion 100. The link portion 200 may enable multi-degree-of-freedom movement of the top portion 100. For example, the link portion 200 may rotate the top portion 100 about a vertical axis, about a first axis perpendicular to the vertical axis, or about a second axis perpendicular to the vertical axis and the first axis. In one embodiment of the present disclosure, the vertical axis may be interpreted as meaning an axis extending in a vertical direction with respect to FIGS. 1 and 2.

The link portion 200 may include a support 210, a first link 220, a second link 230, a first gimbal 240, a third link 250, a fourth link 260, a fifth link 270, a sixth link 280, a seventh link 290, an eighth link 300, a second gimbal 310, a ninth link 320, a tenth link 330, an eleventh link 340, and a twelfth link 350.

The support 210 may be connected to the motor portion 400. The support 210 may be connected to a first motor unit 440 of the motor portion 400. The support 210 may include a second gear 432 formed at a lower end of the support 210. The second gear 432 of the support 210 may be disposed on a gear portion 430. The second gear 432 of the support 210 may mesh with a first gear 442 of the first motor unit 440. The support 210 may rotate about the vertical axis by the first motor unit 440. The support 210 may be coupled to a housing 410.

The support 210 may be coupled with the first gimbal 240. A central area of the support 210 in the vertical direction may penetrate a central area of the first gimbal 240. The support 210 may be coupled to the second gimbal 310. An upper end of the support 210 may be coupled to the second gimbal 310. The support 210 may rotate the first gimbal 240 and the second gimbal 310 about the vertical axis.

The first link 220 may be connected to the motor portion 400. The first link 220 may be coupled to a second motor unit 450 of the motor portion 400. The first link 220 may move in the vertical direction by the second motor unit 450 of the motor portion 400. An upper end of the first link 220 may be coupled to the first gimbal 240. The first link 220 may penetrate an upper plate 420 of the housing 410. The first link 220 may penetrate a first hole 422 of the upper plate 420 of the housing 410.

The first link 220 may be coupled to a first moving member 510. The first link 220 may move in the vertical direction by the first moving member 510. The first link 220 may be rotatably coupled to the first moving member 510. The first link 220 may be hinged to the first moving member 510.

The second link 230 may be connected to the motor portion 400. The second link 230 may be coupled to a third motor unit 460 of the motor portion 400. The second link 230 may move in the vertical direction by the third motor unit 460 of the motor portion 400. An upper end of the second link 230 may be coupled to the first gimbal 240. The second link 230 may penetrate the upper plate 420 of the housing 410. The second link 230 may penetrate a second hole 424 of the upper plate 420 of the housing 410.

The second link 230 may be coupled to a second moving member 520. The second link 230 may move in the vertical direction by the second moving member 520. The second link 230 may be rotatably coupled to the second moving member 520. The second link 230 may be hinged to the second moving member 520.

The first gimbal 240 may be coupled to the upper end of the first link 220. The first gimbal 240 may be coupled to the upper end of the second link 230. The first gimbal 240 may be coupled to an upper end of the third link 250. The first gimbal 240 may be coupled to an upper end of the fourth link 260. The first gimbal 240 may be formed in a rectangular shape as a whole. The upper end of the first link 220, the upper end of the second link 230, the upper end of the third link 250, and the upper end of the fourth link 260 are coupled to each corner of the first gimbal 240.

The first gimbal 240 may be coupled to the support 210. The first gimbal 240 may be coupled to the central area of the support 210 in the vertical direction. A central area in a radial direction of the first gimbal 240 may be penetrated by the support 210.

The third link 250 may be coupled to the first gimbal 240. The upper end of the third link 250 may be coupled to the first gimbal 240. A lower end of the third link 250 may be coupled to a lower end of the fifth link 270.

The fourth link 260 may be coupled to the first gimbal 240. The upper end of the fourth link 260 may be coupled to the first gimbal 240. A lower end of the fourth link 260 may be coupled to a lower end of the sixth link 280.

The fifth link 270 may be coupled to the lower end of the third link 250. The lower end of the fifth link 270 may be coupled to the lower end of the third link 250. The seventh link 290 may be coupled to a central area of the fifth link 270 in the vertical direction. A lower end of the seventh link 290 may be coupled to the central area of the fifth link 270 in the vertical direction. The fifth link 270 may be coupled to the top portion 100. An upper end of the fifth link 270 may be coupled to the top portion 100.

The sixth link 280 may be coupled to the lower end of the fourth link 260. The lower end of the sixth link 280 may be coupled to the lower end of the fourth link 260. The eighth link 300 may be coupled to a central area of the sixth link 280 in the vertical direction. A lower end of the eighth link 300 may be coupled to the central area of the sixth link 280 in the vertical direction. The sixth link 280 may be coupled to the top portion 100. An upper end of the sixth link 280 may be coupled to the top portion 100.

The lower end of the seventh link 290 may be coupled to the central area of the fifth link 270 in the vertical direction. An upper end of the seventh link 290 may be coupled to the second gimbal 310.

The lower end of the eighth link 300 may be coupled to the central area of the sixth link 280 in the vertical direction. An upper end of the eighth link 300 may be coupled to the second gimbal 310.

The second gimbal 310 may be coupled to the upper end of the seventh link 290. The second gimbal 310 may be coupled to the upper end of the eighth link 300. The second gimbal 310 may be coupled to an upper end of the ninth link 320. The second gimbal 310 may be coupled to an upper end of the tenth link 330.

The second gimbal 310 may be formed in a rectangular shape as a whole. The upper end of the seventh link 290, the upper end of the eighth link 300, the upper end of the ninth link 320, and the upper end of the tenth link 330 are coupled to each corner of the second gimbal 310. A central area of the second gimbal 310 may be coupled to the support 210. The second gimbal 310 may be coupled to the upper end of the support 210. The central area of the second gimbal 310 may be penetrated by the support 210.

The upper end of the ninth link 320 may be coupled to the second gimbal 310. A lower end of the ninth link 320 may be coupled to the eleventh link 340.

The upper end of the tenth link 330 may be coupled to the second gimbal 310. A lower end of the tenth link 330 may be coupled to the twelfth link 350.

A lower end of the eleventh link 340 may be coupled to the lower end of the ninth link 320. An upper end of the eleventh link 340 may be coupled to the top portion 100. At least a part of the eleventh link 340 may overlap the first link 220 in the vertical direction.

A lower end of the twelfth link 350 may be coupled to the lower end of the tenth link 330. An upper end of the twelfth link 350 may be coupled to the top portion 100. At least a part of the twelfth link 350 may overlap the second link 230 in the vertical direction.

The motor portion 400 may be connected to the link portion 200. The motor portion 400 may transmit power to the top portion 100 through the link portion 200. The motor portion 400 may be coupled to the robot. For example, the motor portion 400 may be coupled to the shoulder or arm of the robot.

The motor portion 400 may include the housing 410, the gear portion 430, the first motor unit 440, the second motor unit 450, the third motor unit 460, a first rotating member 470, a second rotating member 480, a first moving guide 490, a second moving guide 500, the first moving member 510, the second moving member 520, a first roller 530, a second roller 540, a first elastic member 550, a second elastic member 560, a first fixing member 570, a second fixing member 580, a first guide member 590, and a second guide member 600.

The housing 410 may be disposed under the link portion 200. The first motor unit 440, the second motor unit 450, the third motor unit 460, the first rotating member 470, the second rotating member 480, the first moving guide 490, the second moving guide 500, the first moving member 510, the second moving member 520, the first roller 530, the second roller 540, the first elastic member 550, the second elastic member 560, the first fixing member 570, the second fixing member 580, the first guide member 590, and the second guide member 600 may be disposed in the housing 410. The housing 410 may be formed in a hexahedral shape as a whole. The housing 410 may have front and back openings.

The housing 410 may be disposed above the gear portion 430. The housing 410 may be rotatably coupled to the gear portion 430. The housing 410 may be coupled to the support 210. Through this, the support 210 and the housing 410 may rotate about the vertical axis as a whole by the first motor unit 440.

The gear portion 430 may be disposed under the housing 410. The first gear 442, the second gear 432, a third gear 434, and a fourth gear 436 may be disposed in the gear portion 430. The gear portion 430 may be coupled to the robot. For example, the gear portion 430 may be coupled to the shoulder or arm of the robot. The housing 410 may be rotatably coupled to the gear portion 430 about the vertical axis.

The third gear 434 and the fourth gear 436 disposed inside the gear portion 430 may mesh with the second gear 432. The third gear 434 and the fourth gear 436 may overlap the first gear 442 in the horizontal direction. Based on the second gear 432, the first gear 442, the third gear 434, and the fourth gear 436 may be disposed at intervals of 120 degrees in the circumferential direction. Through this, it is possible to stably rotate the second gear 432 while improving space efficiency.

The first motor unit 440 may be disposed in the housing 410. The first motor unit 440 may be connected to the support 210. The first motor unit 440 may rotate the support 210 and the housing 410 about the vertical axis. The first gear 442 may be formed at a lower end of the first motor unit 440. The first gear 442 may be disposed on the motor portion 400. Specifically, the first motor unit 440 excluding the first gear 442 may be disposed in the housing 410. The first gear 442 may mesh with the second gear 432 formed at a lower end of the support 210. Through this, when the first gear 442 of the first motor unit 440 rotates, the support 210 and the housing 410 may rotate about the vertical axis as a whole. In this case, the top portion 100 may rotate about the vertical axis.

The second motor unit 450 may be disposed in the housing 410. The second motor unit 450 may be connected to the first link 220. The second motor unit 450 may move the first link 220 in the vertical direction.

The second motor unit 450 may include a fifth gear 452 disposed at a lower end of the second motor unit 450. The fifth gear 452 may mesh with a sixth gear 472 of the first rotating member 470. Through this, the second motor unit 450 may rotate the first rotating member 470.

The third motor unit 460 may be disposed in the housing 410. The third motor unit 460 may be connected to the second link 230. The third motor unit 460 may move the second link 230 in the vertical direction.

The third motor unit 460 may include a seventh gear 462 disposed at a lower end of the third motor unit 460. The seventh gear 462 may mesh with an eighth gear 482 of the second rotating member 480. Through this, the third motor unit 460 may rotate the second rotating member 480.

When the second motor unit 450 and the third motor unit 460 move the first link 220 and the second link 230 in the same direction, the top portion 100 may rotate about a first axis perpendicular to the vertical axis. When the second motor unit 450 and the third motor unit 460 move the first link 220 and the second link 230 in different directions, the top portion 100 may rotate about a second axis perpendicular to the vertical axis and the first axis.

The first rotating member 470 may be disposed in the housing 410. The first rotating member 470 may be rotatably coupled to the housing 410. The first rotating member 470 may include the sixth gear 472 formed at a lower end. The sixth gear 472 may mesh with the fifth gear 452 of the second motor unit 450. The first rotating member 470 may rotate about the vertical axis by the second motor unit 450.

The first rotating member 470 may be connected to the first moving member 510. The first rotating member 470 may move the first moving member 510 in the vertical direction.

The first rotating member 470 may extend in the vertical direction. The main body of the first rotating member 470 may be a lead screw. The first rotating member 470 may include a first nut 474 that is coupled to the main body which is the lead screw and moves in the vertical direction according to the rotation of the first rotating member 470. The first nut 474 may be coupled to the first moving member 510. Through this, the first moving member 510 may be moved in the vertical direction according to the rotation of the first rotating member 470.

The second rotating member 480 may be disposed in the housing 410. The second rotating member 480 may be rotatably coupled to the housing 410. The second rotating member 480 may include the eighth gear 482 formed at a lower end. The eighth gear 482 may mesh with the seventh gear 462 of the third motor unit 460. The second rotating member 480 may rotate about the vertical axis by the third motor unit 460.

The second rotating member 480 may be connected to the second moving member 520. The second rotating member 480 may move the second moving member 520 in the vertical direction.

The second rotating member 480 may extend in the vertical direction. The main body of the second rotating member 480 may be a lead screw. The second rotating member 480 may include a second nut 484 that is coupled to the main body which is the lead screw and moves in the vertical direction according to the rotation of the second rotating member 480. The second nut 484 may be coupled to the second moving member 520. Through this, the second moving member 520 may be moved in the vertical direction according to the rotation of the second rotating member 480.

The first moving guide 490 may be disposed in the housing 410. The first moving guide 490 may extend in the vertical direction. The first moving member 510 may be movably coupled to the first moving guide 490 in the vertical direction.

The second moving guide 500 may be disposed in the housing 410. The second moving guide 500 may extend in the vertical direction. The second moving member 520 may be movably coupled to the second moving guide 500 in the vertical direction.

The first moving member 510 may be movably coupled to the first moving guide 490 in the vertical direction. The first moving member 510 may include a first bush 512 coupled to an outer circumferential surface of the first moving guide 490. The first moving member 510 may be coupled to the first rotating member 470. The first moving member 510 may move up and down according to the rotation of the first rotating member 470. The first moving member 510 may be coupled to the first link 220. Through this, the first moving member 510 may move the first link 220 in the vertical direction according to the rotation of the first rotating member 470.

The second moving member 520 may be movably coupled to the second moving guide 500 in the vertical direction. The second moving member 520 may include a second bush 514 coupled to an outer circumferential surface of the second moving guide 500. The second moving member 520 may be coupled to the second rotating member 480. The second moving member 520 may move up and down according to the rotation of the second rotating member 480. The second moving member 520 may be coupled to the second link 230. Through this, the second moving member 520 may move the second link 230 in the vertical direction according to the rotation of the second rotating member 480.

The first roller 530 may be disposed in the housing 410. The first roller 530 may be disposed in a central area of the housing 410 in the vertical direction. The first wire 700 may be wrapped around the first roller 530. The first elastic member 550 may be coupled to a lower end of the first roller 530. The first elastic member 550 may be disposed between the first roller 530 and the housing 410. The first roller 530 may include a first roller unit wrapped by the first wire 700.

The second roller 540 may be disposed in the housing 410. The second roller 540 may be disposed in the central area of the housing 410 in the vertical direction. The second wire 800 may be wrapped around the second roller 540. The second elastic member 560 may be coupled to a lower end of the second roller 540. The second elastic member 560 may be disposed between the second roller 540 and the housing 410. The second roller 540 may include a second roller unit 542 wrapped by the second wire 800.

The first elastic member 550 may be disposed in the housing 410. The first elastic member 550 may be coupled to a lower surface of the first roller 530. The first elastic member 550 may be disposed between the first roller 530 and a bottom surface of the housing 410. Specifically, one end of the first elastic member 550 may be coupled to the lower surface of the first roller 530 and the other end may be coupled to a lower area of the housing 410. The first elastic member 550 may include a plurality of first elastic units spaced apart in the horizontal direction. The first elastic member 550 may be a coil spring extending in the vertical direction. Through this, the first wire 700 may have an appropriate tension.

The second elastic member 560 may be disposed in the housing 410. The second elastic member 560 may be coupled to a lower surface of the second roller 540. The second elastic member 560 may be disposed between the second roller 540 and the bottom surface of the housing 410. Specifically, one end of the second elastic member 560 may be coupled to the lower surface of the second roller 540 and the other end may be coupled to the lower area of the housing 410. The second elastic member 560 may include a plurality of second elastic units spaced apart in the horizontal direction. The second elastic member 560 may be a coil spring extending in the vertical direction. Through this, the second wire 800 may have an appropriate tension.

The first fixing member 570 may be disposed in the housing 410. The first fixing member 570 may be disposed on a lower surface of the upper plate 420 of the housing 410. The other end of the first wire 700 may be coupled to the first fixing member 570.

The second fixing member 580 may be disposed in the housing 410. The second fixing member 580 may be disposed on the lower surface of the upper plate 420 of the housing 410. The other end of the second wire 800 may be coupled to the second fixing member 580.

The first guide member 590 may be disposed in the housing 410. The first guide member 590 may be disposed on the lower surface of the upper plate 420 of the housing 410. The first guide member 590 may guide a position of the first wire 700. The first guide member 590 may include a first guide unit 592 for guiding the position of the first wire 700. The first guide unit 592 may be formed in an 'L' shape.

The second guide member 600 may be disposed in the housing 410. The second guide member 600 may be disposed on the lower surface of the upper plate 420 of the housing 410. The second guide member 600 may guide a position of the second wire 800. The second guide member 600 may include a second guide unit 602 for guiding the position of the second wire 800. The second guide unit 602 may extend in the horizontal direction.

One end of the first wire 700 may be coupled to an upper area of the second link 230. The other end of the first wire 700 may be coupled to the motor portion 400. The other end of the first wire 700 may be coupled to the first fixing member 570. The first wire 700 may sequentially pass through the twelfth link 350, the top portion 100, and the fifth link 270 while going from the one end to the other end of the first wire 700, and penetrate the upper plate 420 of the housing 410, pass through the first guide member 590 and wrap around the first roller 530, and the other end of the first wire 700 may be coupled to the first fixing member 570. The position of the first wire 700 may be guided by a third roller unit 110 and a fourth roller unit 120 of the top portion 100, and tension may be maintained. The first wire 700 may extend to an area between a first plate 272 and a second plate 274 of the fifth link 270.

One end of the second wire 800 may be coupled to an upper area of the first link 220. The other end of the second wire 800 may be coupled to the motor portion 400. The other end of the second wire 800 may be coupled to the second fixing member 580. The second wire 800 may sequentially pass through the eleventh link 340, the top portion 100, and the sixth link 280 while going from the one end to the other end of the second wire 800, and penetrate the upper plate 420 of the housing 410, pass through the second guide member 600 and wrap around the second roller 540, the other end of the second wire 800 may be coupled to the second fixing member 580. The position of the second wire 800 may be guided by a fifth roller unit and a sixth roller unit of the top portion 100, and tension may be maintained. The second wire 800 may extend to an area between a third plate and a fourth plate of the sixth link 280.

Since a pre-load can be applied to the top portion 100 through the first wire 700 and the second wire 800, precise operation of the top portion 100 can be made possible.

FIGS. 15 to 19 are operation diagrams of a robot arm according to an embodiment of the present disclosure.

Figure 15:
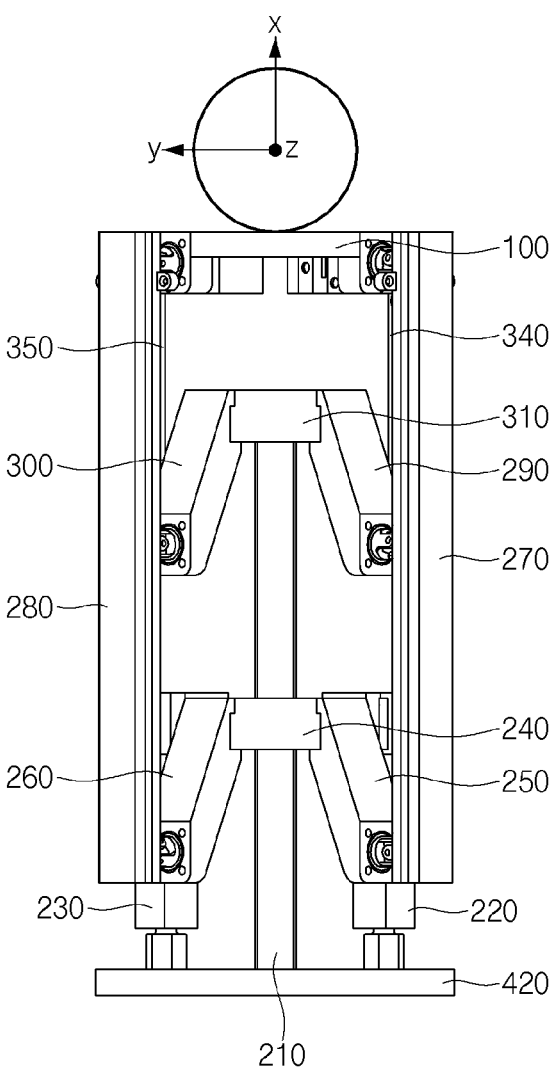
FIGS. 15 to 19 are operation diagrams of a robot arm according to an embodiment of the present disclosure.

Referring to FIG. 15, the support 210 and the housing 410 may rotate about the vertical axis by the first motor unit 440. In this case, the top portion 100 and the link portion 200 may rotate about the vertical axis as a whole. Here, the vertical axis may be interpreted as meaning the x-axis.

Figure 16:
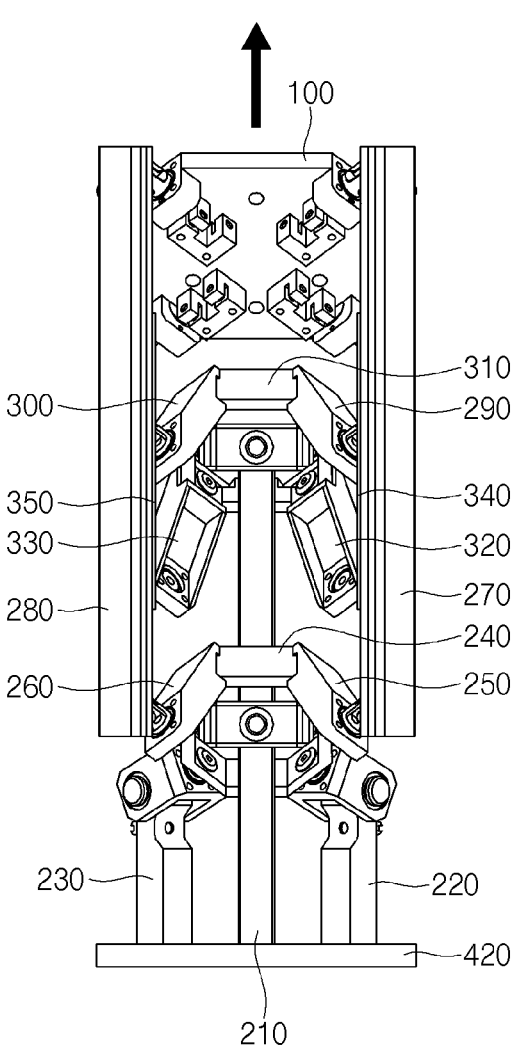
Figure 17:
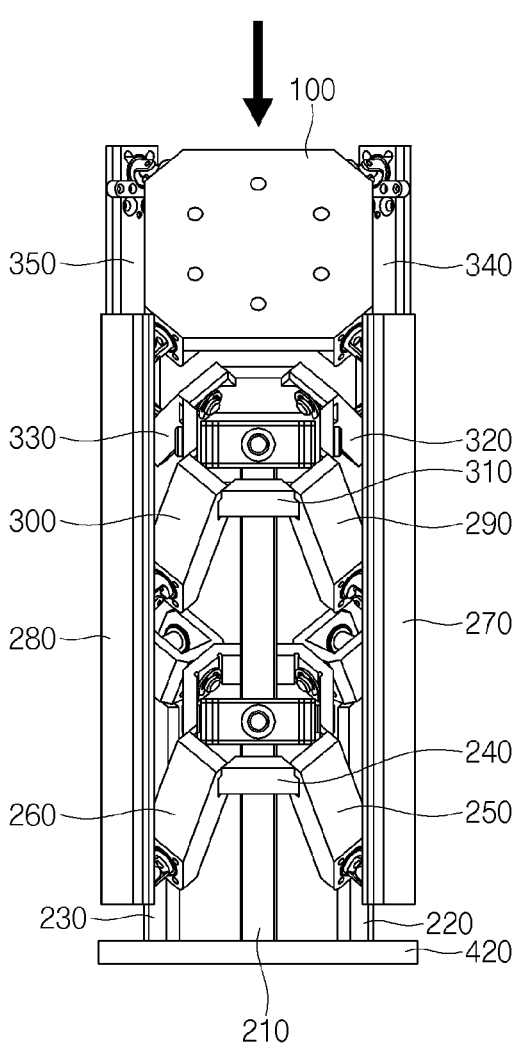

Referring to FIGS. 16 and 17, the second motor unit 450 and the third motor unit 460 may move the first link 220 and the second link 230 in the same direction. In this case, the top portion 100 may rotate about the first axis perpendicular to the vertical axis. Here, the first axis may be interpreted as meaning the y-axis.

Figure 18:
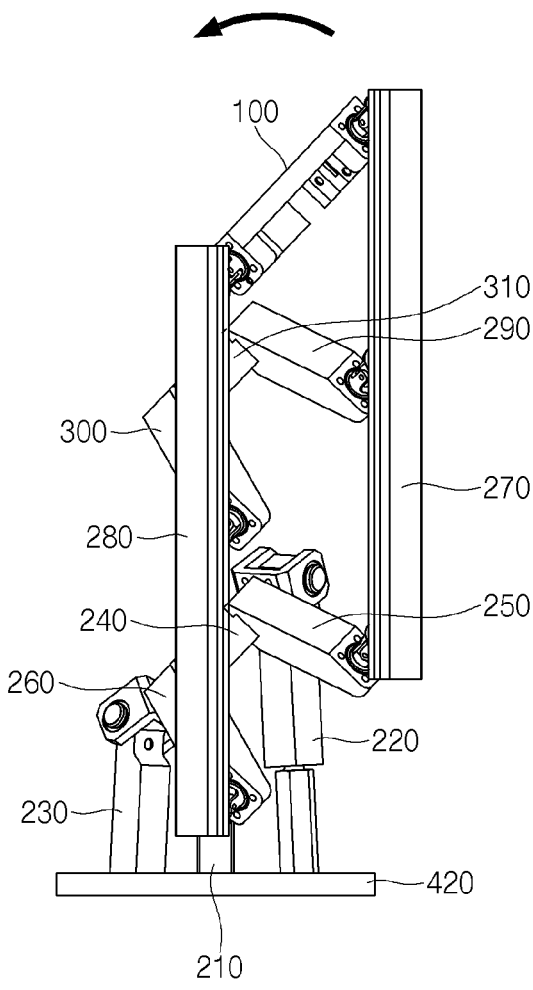
Figure 19:
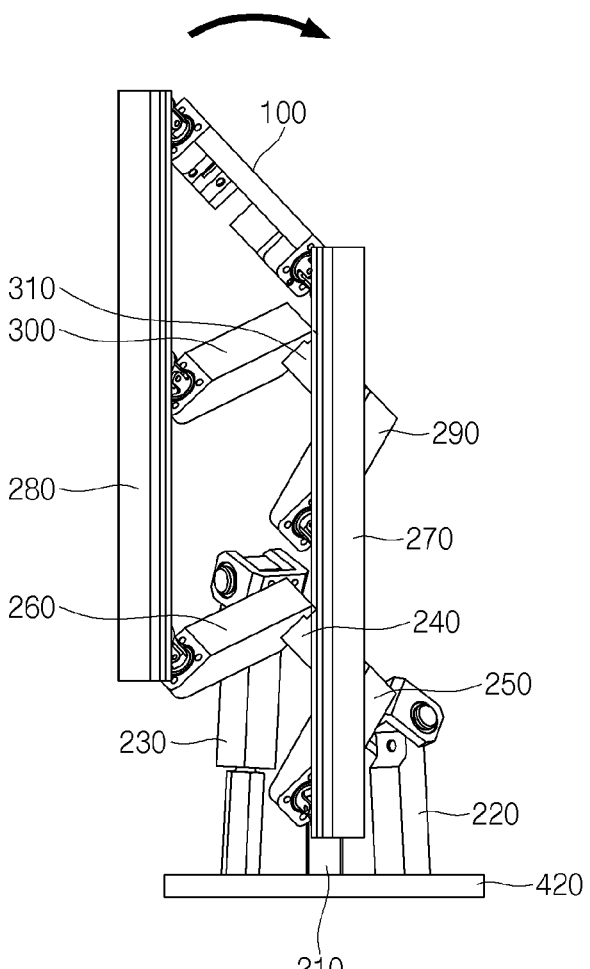

Referring to FIGS. 18 and 19, the second motor unit 450 and the third motor unit 460 may move the first link 220 and the second link 230 in different directions. In this case, the top portion 100 may rotate about the second axis perpendicular to the vertical axis and the first axis.

Here, the second axis may be interpreted as meaning the z axis.

Figure 20:
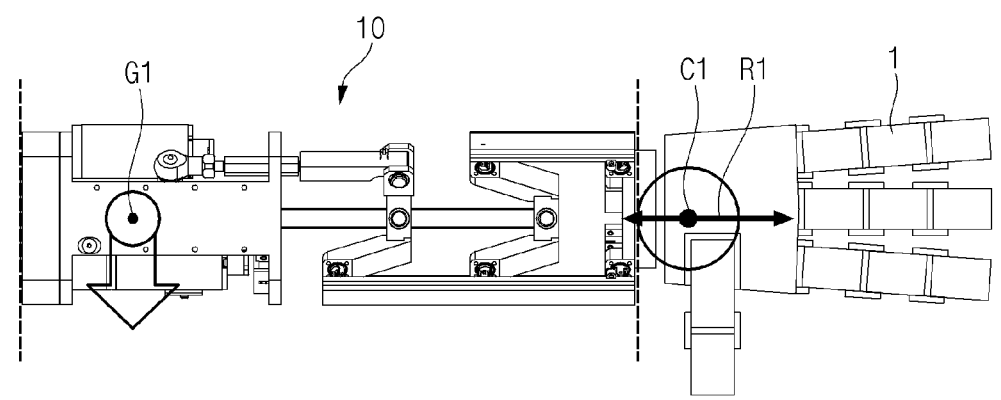
FIG. 20 is a view showing a state in which a hand is attached to a robot arm according to an embodiment of the present disclosure.
Figure 21:
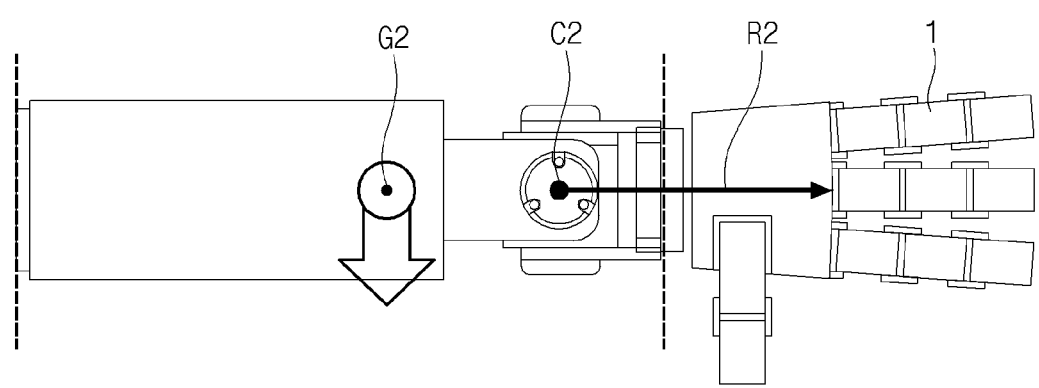
FIG. 21 is a view showing a state in which a hand is attached to a robot arm according to the prior art.

FIG. 20 is a view showing a state in which a hand is attached to a robot arm according to an embodiment of the present disclosure. FIG. 21 is a view showing a state in which a hand is attached to a robot arm according to the prior art.

Referring to FIGS. 20 and 21, it can be seen that the robot arm 10 according to an embodiment of the present disclosure has a first center of gravity G1 on the left side due to the gears disposed on the gear portion 430. In contrast, it can be seen that the second center of gravity G2 of the conventional robot arm is to the right of the first center of gravity G1. Through this, it is possible to reduce a moment generated when moving the robot hand 1 compared to a product of the same weight.

Also, due to the structure of the link portion 200, it can be seen that the first rotation center C1 is disposed closer to the robot hand 1 than the top portion 100. In contrast, it can be seen that the second rotation center C of the conventional robot arm is disposed on the left side of the top portion 100. Through this, the robot arm 10 according to an embodiment of the present disclosure can improve space efficiency due to the first radius of rotation R1 that is smaller than the conventional second radius of rotation R2.

Some or other embodiments of the present disclosure described above are not exclusive or distinct from one another. Some or other embodiments of the present disclosure described above may be used in combination or combined with each configuration or function.

For example, it means that configuration A described in specific embodiments and/or drawings and configuration B described in other embodiments and/or drawings may be combined. In other words, even when the combination between the components is not described directly, it means that the combination is possible except when it is described as not possible to combine.

The above detailed description should not be construed as limiting in all respects and should be considered as illustrative. The scope of the present disclosure should be determined by reasonable interpretation of the appended claims, and all changes within the equivalent scope of the present disclosure are included in the scope of the present disclosure.

What is claimed is:

1. A robot arm comprising:
a motor portion;
a support connected to the motor portion;
first and second links connected to the motor portion and movable in a vertical direction;
a first gimbal coupled to upper ends of the first and second links, respectively;
third and fourth links, upper ends of which are respectively and directly coupled to the first gimbal;
fifth and sixth links coupled to lower ends of the third and fourth links, respectively;
seventh and eighth links coupled to central areas of the fifth and sixth links in the vertical direction;
a second gimbal coupled to upper ends of the seventh and eighth links;
ninth and tenth links, upper ends of which are respectively and directly coupled to the second gimbal;
eleventh and twelfth links coupled to lower ends of the ninth and tenth links; and
a top portion coupled to upper ends of the fifth and sixth links and upper ends of the eleventh and twelfth links; and
a first wire, wherein one end of the first wire is coupled to an upper area of the second link, and another end of the first wire is coup ed to the motor portion,
the first wire sequentially passes through the twelfth link, the top portion, and the fifth link while going from the one end to the another end of the first wire.

2. The robot arm of claim 1, wherein an upper end of the support is coupled to the second gimbal, and a central area in the vertical direction of the support is coupled to the first gimbal, and
the motor portion includes a first motor unit that rotates the support about a vertical axis.

3. The robot arm of claim 2, wherein the first motor unit includes a first gear formed at a lower end of the first motor unit, and the support includes a second gear formed at a lower end of the support and meshing with the first gear.

4. The robot arm of claim 3, wherein the motor portion includes third and fourth gears meshing with the second gear and overlapped with the first gear in a horizontal direction.

5. The robot arm of claim 4, wherein the motor portion includes a housing and a gear portion disposed below the housing, the first motor unit, except for a lower end area, is disposed in the housing, and the first to fourth gears are disposed in the gear portion.

6. The robot arm of claim 1, wherein the motor portion includes a second motor unit that moves the first link in the vertical direction, and a third motor unit that moves the second link in the vertical direction.

7. The robot arm of claim 6, wherein when the second motor unit and the third motor unit move the first link and the second link in the same direction, the top portion rotates about a first axis perpendicular to the vertical axis, and when the second motor unit and the third motor unit move the first link and the second link in different directions, the top portion rotates about a second axis perpendicular to the vertical axis and the first axis.

8. The robot arm of claim 6, wherein the second motor unit includes a fifth gear disposed at a lower end of the second motor unit, and the motor portion includes a first rotating member including a sixth gear meshing with the fifth gear, and a first moving member that moves in the vertical direction according to rotation of the first rotating member and is coupled with the first link.

9. The robot arm of claim 8, wherein the third motor unit includes a seventh gear disposed at a lower end of the third motor unit, and the motor portion includes a second rotating member including an eighth gear meshing with the seventh gear, and a second moving member that moves in the vertical direction according to rotation of the second rotating member and is coupled with the second link.

10. The robot arm of claim 9, wherein the first link is hinged to the first moving member, and the second link is hinged to the second moving member.

11. The robot arm of claim 1, wherein the motor portion includes a first roller disposed in the housing, a first guide member and a first fixing member disposed on a lower surface of an upper plate of the housing, and a first elastic member, wherein one end of the first elastic member is coupled to a lower surface of the first roller and another end of the first elastic member is coupled to a lower area of the housing, and the first wire penetrates the upper plate of the housing, passes through the first guide member and wraps around the first roller, and the another end of the first wire is fixed to the first fixing member.

12. The robot arm of claim 1, further comprising:

a second wire, wherein one end of the second wire is coupled to an upper area of the first link, and another end of the second wire is coupled to the motor portion, the motor portion includes a second roller disposed in the housing, a second guide member and a second fixing member disposed on a lower surface of an upper plate of the housing, and a second elastic member, wherein one end of the second elastic member is coupled to a lower surface of the second roller and another end of the second elastic member is coupled to a lower area of the housing, and the second wire sequentially passes through the eleventh link, the top portion, and the sixth link while going from the one end to the another end, and penetrates the upper plate of the housing, passes through the second guide member and wraps around the second roller, and the another end of the second wire is fixed to the second fixing member.

* * * * *